Feb. 19, 1935.  C. T. BLOOMQUIST  1,991,782
VEHICLE
Original Filed April 7, 1932   2 Sheets-Sheet 1
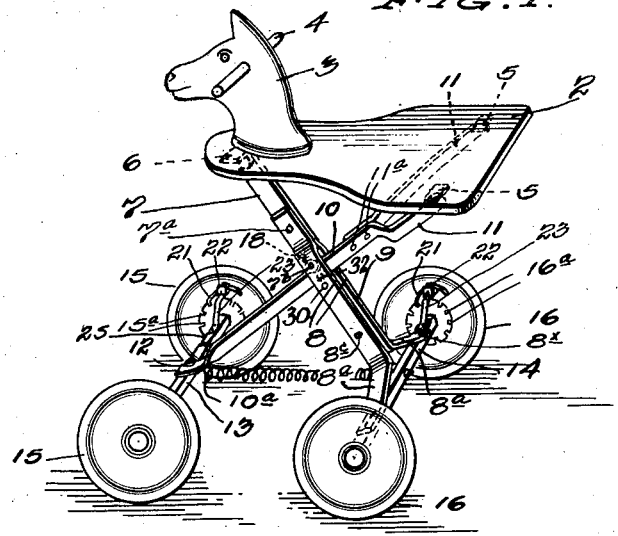
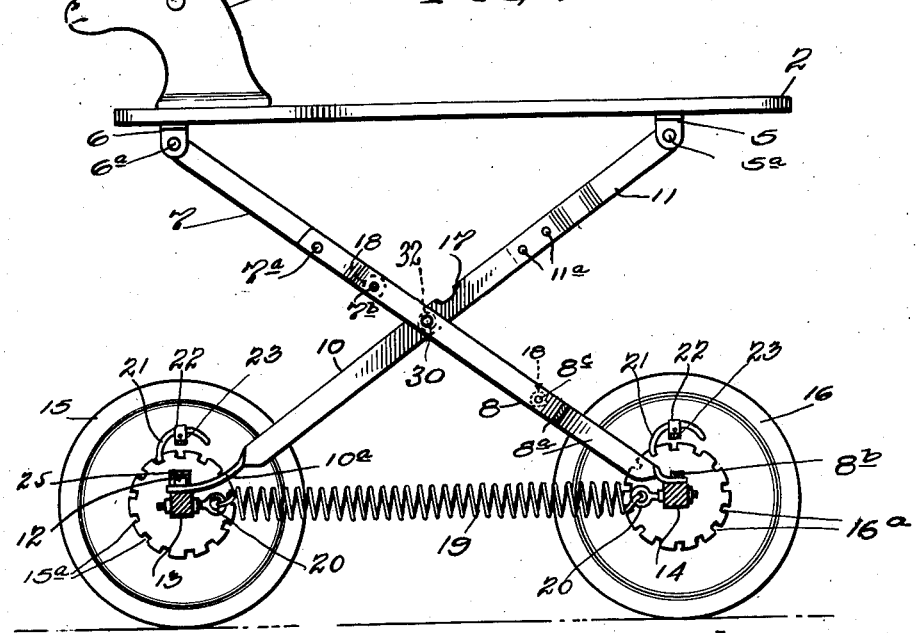
INVENTOR
CLARENCE T. BLOOMQUIST
BY Eugene C. Stevens
ATTORNEY Feb. 19, 1935.  C. T. BLOOMQUIST  1,991,782
VEHICLE
Original Filed April 7, 1932  2 Sheets-Sheet 2
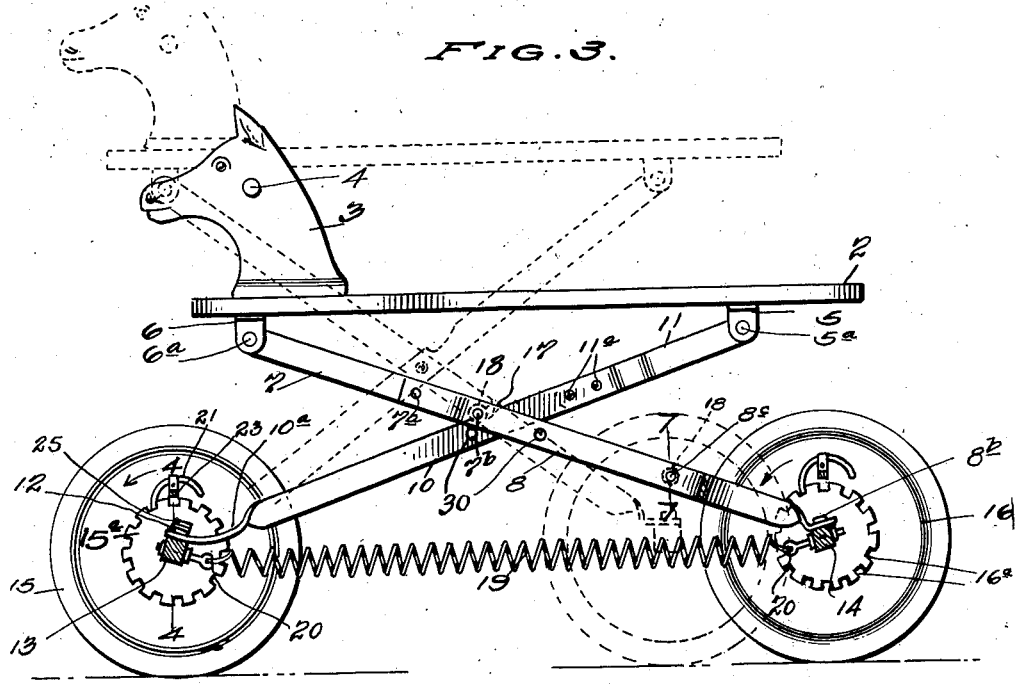
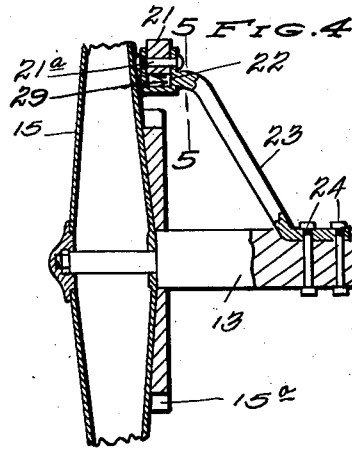
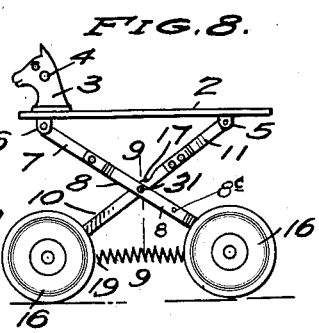
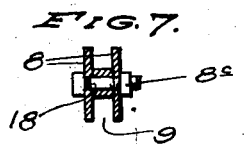
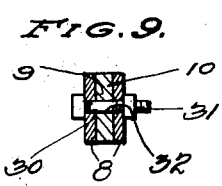
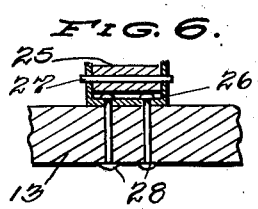
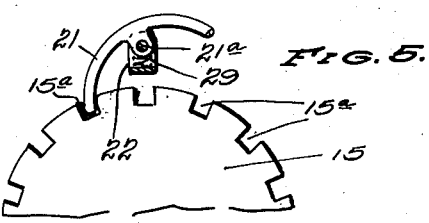
INVENTOR
CLARENCE T. BLOOMQUIST
BY
ATTORNEY Patented Feb. 19, 1935

1,991,782

UNITED STATES PATENT OFFICE 1,991,782

VEHICLE

Clarence T. Bloomquist, North Escanaba, Mich.

Application April 7, 1932, Serial No. 603,858
Renewed July 14, 1934

12 Claims. (Cl. 208—38)

My invention relates to a child's vehicle or the like, and particularly to an improved propulsion means therefor whereby it may be caused to advance in step-by-step fashion,—it being understood however that other novel features are involved and that the invention is not necessarily limited to a child's vehicle.

Briefly stated,—the invention has for an important object to provide a child's vehicle, or the like, which may be propelled by vertical reciprocations of the seat (or equivalent) through consecutive spreading and drawing together of the axles which have lever connections with the seat; and which may also be used as a stroller, or drawn vehicle, if desired,—the arrangement of the levers being such that they may incorporate means whereby they may be locked against movement.

Another object of the invention is to provide, in a vehicle adapted to be propelled by alternately spreading apart and retracting together the axles,—a novel and greatly simplified arrangement of axle-supporting levers which will be self-guided in their movements, and which also incorporate stop means for defining the limit of a particular relative movement of the levers.

The invention also contemplates a vehicle of this class which incorporates novel pawl and ratchet means, associated with the axles and wheels respectively, for preventing rotation of the wheels except in a predetermined direction so that when the axles are alternately spread apart and drawn toward one another the vehicle will be advanced in step-by-step fashion.

It is also an object of the invention to provide a novel pressed metal wheel providing the ratchet integral therewith; or a wheel where the ratchet is cast integral therewith.

The invention also resides in certain novel features of construction, combination, and arrangement of the various parts, such as foot rests and the like,—and in various modes of operation and methods of use,—all of which will be readily apparent to those skilled in the art upon reference to the accompanying drawings in connection with the detailed description there, to follow.

It is to be understood that the drawings illustrate, what is now regarded as a preferred mechanical expression of the invention. However, obviously the disclosure is susceptible of considerable change and modification, within the spirit and scope of the subject matter claimed hereinafter.

In the drawings, wherein the same reference characters have been used to designate the same parts throughout the several views,—

Figure 1 is a perspective view of a child's vehicle incorporating my invention:

Figure 2 is a view in side elevation, partly in section, and showing a little variation in the rear axle and frame connection;

Figure 3 is a view similar to Figure 2 but showing the parts in the position they assume just prior to the advancement of the rear axle to normal position,—which is shown in dotted lines;

Figure 4 is a sectional detail taken on the line 4—4 of Figure 3;

Figure 5 is a sectional view taken on the line 5—5 of Figure 4;

Figure 6 is a cross sectional view through one of the foot rests of the front axle;

Figure 7 is a sectional view taken on the line 7—7 of Figure 3 and showing a spacer bushing and rivet;

Figure 8 is a side elevational view of the device with the operating levers locked, and Figure 9 is a sectional view on line 9—9 of Figure 8.

Referring to the drawings by reference characters, numeral 2 denotes a seat which is narrowed at its forward end, whereat it is provided the upstanding ornamental head 3 having the laterally projecting handles 4.

Beneath the seat 2 at the widened rear portion are the bearing brackets 5, and at the front the medial bearing 6.

Pivoted on a pin $6^a$ in bearing bracket 6 is one end of a lever 7 whose outer end is made in sections or otherwise to provide the parallel branches 8 defining the intermediate guide slot 9 (Figure 1). The branches 8 of lever 7 are secured together as at $7^a$, $7^b$, $8^c$ by rivets or the like,—of which $7^b$, $8^c$ which define the maximum working limits of the guide slot 9 have spacer bushings 18 thereon, as shown in Figures 1 and 7. The lever 7 extends rearwardly and downwardly, as shown, and the ends of the branches 8 are bent laterally as at $8^a$, and secured to the rear axle 14 as indicated at $8^b$, in Fig. 2, or $8^x$ in Fig. 1.

Associated with the lever 7, in the support of the seat 2, is the lever 10 which works in the slot 9 of lever 7. The upper end of the lever 10 is branched as at 11 and such branches are pivoted on the bearing pins $5^a$ in the bearing brackets 5. The lower end of the lever 10 is twisted as at $10^a$ and pivoted to the front axle 13 by the bolt, or other pivot means, 12 which is located intermediate the ends of the axle 13.

The front and rear wheels 15, 16, respectively, are duplicates. Thus description of one will suffice. As indicated in Figure 4 the wheels have their inner sides provided with integral annular ratchets 15ª, 16ª which are adapted to be engaged by pawls 21, to which latter particular reference will be presently made. Of course the wheels 15, 16 may be made by a casting as well as a stamping process, but for purposes of economy in manufacture and assembly, I prefer to make the ratchets 15ª, 16ª integral.

A spring 19, secured, as indicated in Figure 2, to eyelets 20 in the front and rear axles 13, 14 serves to normally maintain the axles 13, 14 in proximity to one another. However, when the occupant depresses the seat 2 it will be obvious that the front axle 13 will be advanced to the full line position of Figure 3, it being understood, of course, that the pawls 21 engaging the ratchets 15ª, 16ª, will permit of movement of the wheels 15, 16 in a forward direction only. Still referring to Figure 3, it will be equally plain that when the occupant raises his weight from the seat 2 the spring 19 will draw the axles 13, 14 toward one another again,—which is to say the rear axle will be drawn forwardly (see dotted lines Figure 3),— for the reason that the front wheel pawls 21 prevent them from turning rearwardly. In this fashion the vehicle may be advanced in step-by-step manner through vertical reciprocation of the seat 2 and the resultant movements of levers 7, 10.

Very particular attention is directed to the novel arrangement of the levers 7, 10 which not only directly connect the seat with the axles,— but also, by reason of guide slot 9, are maintained in coacting relationship. This obviates the necessity of any frame parts other than levers 7, 10.

Another thing to be noted in connection with the levers 7, 10 and the guide slot 9 is that provision is made whereby the seat is prevented from over tilting in either a forward or rearward direction. Figures 2 and 3 show the lever 10 to be provided inwardly of its branches 11 with an upper edge notch 17,—and Figure 3 shows very aptly that when the occupant's weight is thrown rather more forwardly than rearwardly of the seat 2, (as it normally will be) such notch 17 will come to seat upon the spacer bushing 18 about the spacer pin or rivet 7ᵇ to prevent further downward movement. Similarly, if the occupant's weight is distributed rather more rearwardly than forwardly, the diverging arms or branches 11 of the lever 10 will engage the upper edges of the slot-providing branches 8 of lever 7 to prevent excessive rearward tilting of the seat. The exact location of notch 17 (or the equivalent) is, of course, a matter of choice.

Where the lever 10 is made in two parts to provide the branches 11, the parts will be riveted or otherwise secured together as indicated at 11ª, (Figures 2 and 3).

Referring to the pawls 21, they are seen to be mounted (note Figure 4) on bearing pins 21ª of a bearing 22 at the offset upper end of a bracket 23 which extends diagonally upward and outward from and in the plane of the axle 13, or 14 as the case may be. Such bearing brackets 23 are secured to the axles by rivets, or otherwise as indicated at 24 (Figure 4). It is of importance to observe that the bearings 22 of brackets 23 are of sufficient depth to accommodate the coil springs 29 (see Figures 4, 5) which act upon depending pawl portions to yieldingly hold them off center to keep the pawl end in engagement with the ratchet 15ª (16ª).

The general operation and outstanding advantages of the construction have been stressed elsewhere herein, and repetition here is not thought necessary. However, in order that the occupant may steer the vehicle conveniently, I provide the front axle 13, at opposite sides of the pivot 12, with the foot rests 25 (Fig. 6). These are preferably of rubber and rockable on pins 27 carried in bearings 26, which are riveted or otherwise secured to the axle as indicated at 28,—(see Figures 1 and 6). The relative arrangement of the parts, and particularly the direct connection of the levers 7, 10 with the seat and axles 13, 14 greatly reduces the height of the device thus enabling the occupant's legs to readily reach the foot rests 25 at all times without necessitating a shortening of the working stroke of the levers 7, 10. In other words, with applicant's construction, a greater working stroke is possible in a given size of device than would be the case if the levers were not directly connected with the axle and seat.

In conclusion, applicant's lever arrangement has the further advantage of enabling the levers 7, 10 to be locked by simply inserting a pin 31 through the registerable holes 30, 32 of the levers 7, 10,—respectively,—as indicated in Figures 8 and 9. When this is done, the levers 7, 10 provide a rigid frame and the device is no longer occupant propellable and may be pulled or pushed along like a stroller or cart. This is an especially advantageous point, as a child will often tire while out riding and will require that he be pulled or carried.

The wheels 15, 16 run loosely on the rounded ends of the axles, as indicated,—and it will be noted that the axles are permitted to rock inwardly slightly as the levers 7, 10 move them to extreme outward positions relatively of one another.

Pawls 21 are double acting in that they can be manually thrown to cause either end to engage the ratchet teeth 15ª, 16ª, so that the vehicle may be propelled in a forward or rearward direction at will. Springs 29 (Figures 4 and 5) yieldingly maintain the original setting of the pawls.

Having thus described my invention, what I claim as new and desire to secure by Letters Patent of the United States is:

1. A vehicle of the class described comprising a seat and a pair of axles, wheels on said axles, said wheels and axles having cooperating means limiting movement of the wheels to a single direction, crossed levers pivotally secured to said seat at opposite ends and each to one of said axles, and said levers cooperating to maintain themselves in coacting relationship and having interengaging means for this purpose.

2. A vehicle of the class described comprising in combination, a seat, front and rear axles having wheels and means for limiting rotation of the wheels to one direction, and crossed levers pivotally connected to opposite ends of said seat and each lever secured to one of said axles.

3. A vehicle of the class described comprising in combination, a seat, front and rear axles having wheels and means for limiting rotation of the wheels to one direction, crossed levers pivotally connected to the seat at opposite ends, one of said levers being connected to the rear axle and the other to the front axle, and one of said levers providing a guide portion slidably receiving the other lever.

4. The combination set forth in claim 2, and said levers having interengagable means for limiting movement of the seat toward said axles.

5. The combination set forth in claim 3,—and said guide portion admitting of swinging movement of said levers relatively of one another, and said levers having cooperating means for limiting such swinging movement.

6. The combination set forth in claim 3,—and means connected to said guide portion for locking such levers against movement.

7. In a vehicle, a support, a pair of wheeled axles, and relatively movable crossed levers pivoted to said support at opposite ends, and each connected to an axle for connecting the axles to the support, and means secured to the axle tending to draw said axles together.

8. In a vehicle, a support, a pair of wheeled axles, relatively movable crossed levers pivoted to said support at spaced points and each connected to an axle, and lever carried means for locking the same against movement.

9. In a vehicle, a support, a pair of wheeled axles, relatively movable crossed levers pivoted to said support at spaced points and each connected to an axle, said levers having interengaging guide portions, and locking means connected to said guide portions.

10. In a vehicle of the type described comprising a seat or support and adapted to be advanced step by step through vertical reciprocations of said seat or support, a pair of axles, levers secured to said axles and pivoted to said seat at lineally spaced points, said levers crossing intermediate their ends and having interengaging guide means permitting relative movement thereof, wheels rotating on said axles, said wheels having an annular series of ratchet teeth at one side thereof, brackets carried by said axles adjacent said wheels, pawls pivoted in said brackets and adapted to engage said wheel-provided ratchet teeth, and a spring connecting said axles.

11. The combination set forth in claim 10, and said lever guide means having a locking means adapted to hold the levers against relative movement.

12. The combination set forth in claim 10,—and one of said axles having foot rests at opposite sides of the point of attachment of the lever thereto, and said lever having a vertical pivot connecting the same to the axle.

CLARENCE T. BLOOMQUIST.